Aug. 7, 1945.　　　M. GUDKOV　　　2,381,347
MUSICAL GAME BOARD
Filed Nov. 2, 1943　　　2 Sheets-Sheet 1
Fig. 1
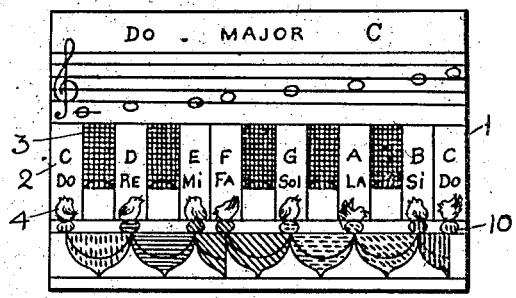
Fig. 2　　Fig. 3
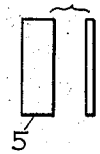 
Fig. 4
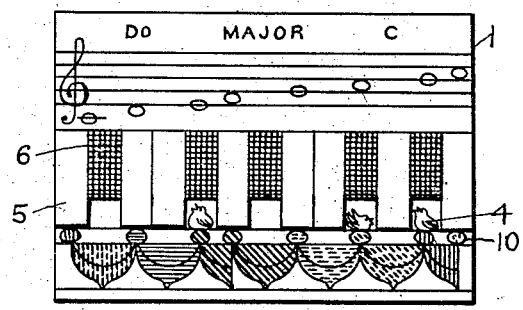
Fig. 5
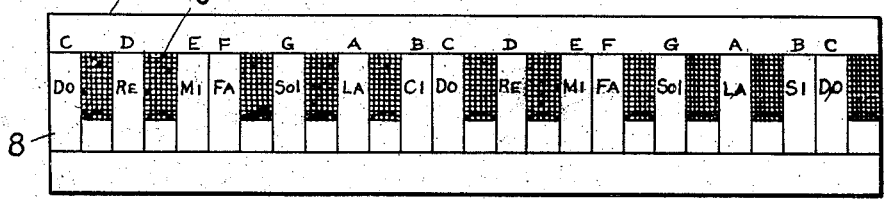
Marie Gudkov
INVENTOR
BY John P. Nikonow
ATTORNEY Aug. 7, 1945.   M. GUDKOV   2,381,347
MUSICAL GAME BOARD
Filed Nov. 2, 1943   2 Sheets-Sheet 2
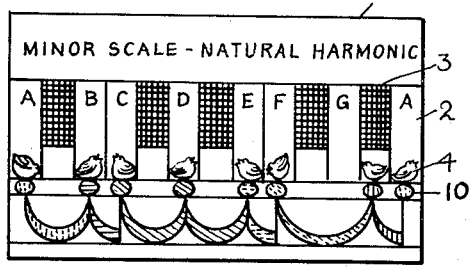
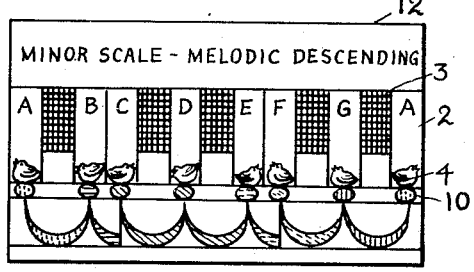
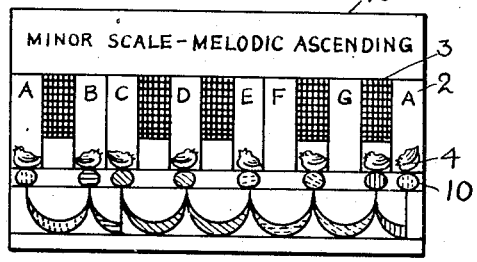
MARIE GUDKOV
INVENTOR
BY John P. MRonow
ATTORNEY Patented Aug. 7, 1945

2,381,347

UNITED STATES PATENT OFFICE 2,381,347

MUSICAL GAME BOARD

Marie Gudkov, New York, N. Y.

Application November 2, 1943, Serial No. 508,727

6 Claims. (Cl. 84—478)

My invention relates to musical game boards and has particular reference to game boards representing piano keys.

My invention has for its object to provide a game board which can be used for teaching piano lessons, in particular lessons relating to the scales in which flats and sharps are employed, or diatonic major scales.

I provide for this purpose a guiding board on which at least two octaves of piano keys are represented also separate playing boards on which octaves of piano keys are represented, as follows: from C to C for a major scale, and from A to A for minor scales. I also provide movable strips corresponding to the black and white piano keys, the strips to be placed on the playing boards for forming different scales, using the guiding board to indicate the succession of different keys.

I also provide symbols under the keys on the playing boards to indicate the keys to be struck for playing the particular scale, as well as upper symbols above the lower symbols for indicating flats and sharps when new scales are formed.

My invention is more fully described in the accompanying specification and drawings in which:

Fig. 1 is a plan view of my playing major board;

Figs. 2 and 3 are views of loose strips used for building up a diatonic major scale;

Fig. 4 is a view of my board with strips in place, indicating their positions for an A scale.

Fig. 5 is a plan view of an auxiliary board representing two octaves of piano keys;

Fig. 6 is a view of my minor natural scale;

Fig. 7 is a view of my minor melodic scale;

Fig. 8 is a view of my minor melodic scale.

My game board consists of a main or playing board 1 shown in Fig. 1, which represents a row of piano keys of one octave, from C to C (do to do), in an exact sequence of white 2 and black 3 keys. Upper symbols, such as birds 4, are imprinted on the lower extensions of the white keys, with lower symbols, such as eggs 10, under the keys, these symbols indicating the keys to be struck in actual playing of a particular scale. With lower symbols (such as eggs) 10, under the keys, these symbols indicating the keys to be struck in an actual playing of a particular scale.

There is also provided a number of loose strips 5 and 6, Figs. 2 and 3, corresponding in size and color to the white and black keys.

A reference board 7 may be also provided to take place of an ordinary piano keyboard for use with my game board. The auxiliary board also has white piano keys 8 and black keys 9 imprinted thereon, corresponding to two octaves, with symbols, indicating the value of each key.

My game board is used as follows:

Suppose, it is desired to build up an A (la) major scale. Long and short strips are then placed on the playing board, beginning with its left end, in a correct sequence, corresponding to the sequence of the keys on the reference board 7 (or on a piano keyboard). Thus a long strip 5 is first placed, corresponding to the white A key on the reference board; then a short black strip 6, two long strips, etc.; as a result, three birds will be uncovered, indicating positions of three sharps. It should be noted that all birds or similar symbols, coming out at the right, represent sharps, and when they come out at the left, represent flats.

The symbols 10 under the keys indicate the keys to be played on the piano, regardless of the kind of the major scale built up with the board with the strips. The birds in this case indicate the black keys to be played for the scale.

My game board makes it possible easily and quickly to learn all the diatonic major scales, i. e., series of tones, ascending or descending in a specified order: step, step, half a step, step, step step, half a step, containing eight tones to the octave.

The board 1 covers the diatonic major scales field and is very useful in teaching and practicing the construction of such scales. The scales on board 1 represent exactly this order, as white keys of a piano give the modern diatonic series of tones for C (do) major scales. The board can be modified for other scales.

A playing board 11 for a natural harmonic scale is shown in Fig. 6. It starts with the note A, all the other notes, as in the other scales, being indicated on the board with the corresponding symbols (A, B, C, D, E, F, G, A, or do, re, mi, fa, sol, la, si, do). The lower and upper symbols are distributed differently than in the major scale, to indicate playing of the minor scale.

A similar playing board 12 for melodic minor scale is shown in Fig. 7. This board also starts with the note A but the lower and upper symbols are located in different positions than on the natural scale.

A melodic minor scale 13 is shown in Fig. 8, with the lower and upper symbols correspondingly arranged. Other minor scales are built up with the loose strips in the same manner as described for the major scale.

Additional ornamental figures 14 are placed under the symbols on the boards, colored in rainbow colors, to indicate similarity between the musical tones and different colors. These symbols also serve to indicate full tones and half tones by the length of space occupied on the board.

It is understood that my musical game board may be further modified without departing from the spirit of the invention, as set forth in the appended claims.

I claim as my invention:

1. A musical game board comprising a playing board having thereon images of thirteen black and white piano keys corresponding to a musical scale, also lower symbols under the lower ends of the key images for indicating the keys to be struck for playing a scale, also upper symbols above the lower symbols on the lower portions of the white keys and white lower extensions of the black keys; and a plurality of long white strips and short black strips corresponding to the images on the board of the black and white keys, the strips being mounted on the board over the images for forming a desired scale, the white strips covering the upper symbols, the uncovered upper symbols serving to indicate sharps and flats of the formed scale.

2. A musical game board comprising a playing board having thereon images of thirteen black and white piano keys corresponding to a musical scale, also lower symbols under the lower ends of the key images for indicating the keys to be struck for playing a scale, also upper symbols above the lower symbols on the lower portions of the white keys and white lower extensions of the black keys; a plurality of long white strips and short black strips corresponding to the images on the board of the black and white keys, the strips being mounted on the board over the images for forming a desired scale, the white strips covering the upper symbols, the uncovered upper symbols serving to indicate sharps and flats of the formed scale; and a guiding board representing at least two octaves of piano keys with the names of the notes indicated thereon and serving as a guide for forming a desired scale.

3. A musical game board comprising a playing board having thereon images of thirteen black and white piano keys corresponding to a musical scale, the white keys having names of the musical notes imprinted thereon, also lower symbols under the lower ends of the key images for indicating the keys to be struck for playing a scale, also upper symbols above the lower symbols on the lower portions of the white keys and white lower extensions of the black keys; and a plurality of long white strips and short black strips corresponding to the images on the board of the black and white keys, the strips being mounted on the board over the images for forming a desired scale, the white strips covering the upper symbols, the uncovered upper symbols serving to indicate sharps and flats of the formed scale.

4. A musical game board comprising a playing board having thereon images of thirteen black and white piano keys corresponding to a musical scale, the white keys having names of the musical notes imprinted thereon corresponding to the major scale from A to A, also lower symbols under the lower ends of the key images for indicating the keys to be struck for playing a scale, also upper symbols above the lower symbols on the lower portions of the white keys and the white lower extensions of the black keys; and a plurality of long white strips and short black strips corresponding to the images on the board of the black and white keys, the strips being mounted on the board over the images for forming a desired scale, the white strips covering the upper symbols, the uncovered upper symbols serving to indicate sharps and flats of the formed scale.

5. A musical game board comprising a playing board having thereon images of thirteen black and white piano keys corresponding to a musical scale, the white keys having names of the musical notes imprinted thereon corresponding to the minor scale from A to A, also lower symbols under the lower ends of the key images for indicating the keys to be struck for playing a scale, also upper symbols above the lower symbols on the lower portions of the white keys and white lower extensions of the black keys; and a plurality of long white strips and short black strips corresponding to the images on the board of the black and white keys, the strips being mounted on the board over the images for forming a desired scale, the white strips covering the upper symbols, the uncovered upper symbols serving to indicate sharps and flats of the formed scale.

6. A musical game board comprising a first playing board having therein images of thirteen white and black keys corresponding to piano keys from C to C having names of the notes imprinted thereon, also lower symbols under the white keys for indicating the keys to be placed for the major scale, also upper symbols on the lower extensions of the white keys and on the white extensions of the black keys; a second playing board having thereon images of thirteen black and white piano keys from A to A with the names of the notes imprinted on the white keys, also lower symbols under the keys to be placed for the scale of natural harmonics with the corresponding upper symbols; a third playing board having thereon images of thirteen black and white piano keys from A to A with lower symbols under the lower ends of the keys with corresponding upper symbols on the lower extensions of the keys for indicating keys to be placed for melodic ascending minor scale; a fourth playing board having thereon images of thirteen black and white piano keys from A to A with lower symbols under the lower ends of the keys with corresponding upper symbols on the lower ends of the keys for indicating keys to be placed for the descending minor scale; a guiding board having thereon at least twenty-six images of black and white piano keys covering two octaves; and a plurality of strips corresponding to long white and short black piano keys, mounted on the playing boards for forming other major and minor scales.

MARIE GUDKOV.